(12) United States Patent
Reber et al.

(10) Patent No.: US 11,320,333 B2
(45) Date of Patent: May 3, 2022

(54) AIRCRAFT WEIGHT AND CENTER OF MASS ESTIMATION SYSTEM

(71) Applicant: GOODRICH CORPORATION, Charlotte, NC (US)

(72) Inventors: Susanne M. Reber, Strongsville, OH (US); Kevin Hawko, East Granby, CT (US); Amir Fazeli, Mississauga (CA); Adnan Cepic, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/927,813

(22) Filed: Jul. 13, 2020

(65) Prior Publication Data

US 2022/0011189 A1    Jan. 13, 2022

(51) Int. Cl.
*G01M 1/12*    (2006.01)
*B64C 25/60*   (2006.01)

(52) U.S. Cl.
CPC ............. *G01M 1/125* (2013.01); *B64C 25/60* (2013.01)

(58) Field of Classification Search
None
See application file for complete search history.

(56) References Cited

U.S. PATENT DOCUMENTS

| | | | |
|---|---|---|---|
| 3,310,976 A | 3/1967 | Bussell et al. | |
| 5,214,586 A | 5/1993 | Nance | |
| 6,128,951 A * | 10/2000 | Nance | G01G 19/07 701/124 |
| 7,945,422 B2 | 5/2011 | Vetsch | |
| 8,180,504 B1 | 5/2012 | Nance | |
| 9,927,319 B2 | 3/2018 | Nance | |
| 2011/0087424 A1* | 4/2011 | Long | G01G 19/07 701/124 |
| 2015/0100227 A1 | 4/2015 | Nance | |
| 2015/0316438 A1* | 11/2015 | Nance | G01M 1/125 701/3 |
| 2016/0144975 A1 | 5/2016 | Tomov | |

FOREIGN PATENT DOCUMENTS

| | | |
|---|---|---|
| WO | 9316359 | 8/1993 |
| WO | 1996007087 | 3/1996 |

OTHER PUBLICATIONS

Amir Fazeli, et al., "Aircraft Weight and Center of Mass Estimation System", SAE Technical Paper 2016-01-2025, 2016, doi:10.4271/2016-01-2025., Sep. 20, 2016, pp. 1-5.

European Patent Office, European Search Report dated Dec. 16, 2021 in Application No. 21182751.4.

* cited by examiner

*Primary Examiner* — Paul M. West
*Assistant Examiner* — Mark A Shabman
(74) *Attorney, Agent, or Firm* — Snell & Wilmer L.L.P.

(57) ABSTRACT

A system and various methods for determining a center of mass of an aircraft with a plurality of shock strut assemblies is illustrated. Multiple sensors, including a gas pressure sensor, and/or a position sensor, may be used to gather data and determine the center of mass of the aircraft. Various methods illustrated herein may evaluate the center of mass relative to a wheelbase axis and a wheel tread axis based on the gathered data.

19 Claims, 5 Drawing Sheets

AIRCRAFT WEIGHT AND CENTER OF MASS ESTIMATION SYSTEM

FIELD

The present disclosure relates generally to shock strut assemblies and more specifically, to systems and methods for center of mass lateral distance aircraft weight and center of mass estimation through shock strut assemblies.

BACKGROUND

Conventionally, various types of aircraft utilize shock strut assemblies to assist in reducing and managing energy transmitted from landing gear to the structure of an aircraft to which the landing gear is attached. Such shock strut assemblies often feature a piston that compresses a fluid within a sealed chamber. The fluid typically includes a gas segment and a liquid segment.

SUMMARY

A method for estimating a center of mass of an aircraft via a shock strut system is disclosed herein. The method may comprise: receiving, by a processor, a first gas pressure of a first shock strut from a takeoff phase to a landing phase of the aircraft from a first gas pressure sensor; receiving, by the processor, a second gas pressure of a second shock strut from the takeoff phase to the landing phase of the aircraft from a second gas pressure sensor; receiving, by the processor, a third gas pressure of a third shock strut from the takeoff phase to the landing phase of the aircraft from a third gas pressure sensor; determining, by the processor, the center of mass of the aircraft based on the first gas pressure, the second gas pressure, the third gas pressure, a wheel tread distance, a wheelbase distance, and landing gear rake angles; and transmitting, by the processor, the center of mass of the aircraft to a device.

In various embodiments, the takeoff phase may be determined by sensing at least one of the first gas pressure, the second gas pressure, the third gas pressure, being less than a threshold pressure. The landing phase may be determined by sensing at least one of the first gas pressure, the second gas pressure, the third gas pressure, rises and then remains substantially constant over a predetermined period of time. The method may further comprise: receiving, by the processor, a first stroke of the first shock strut from the takeoff phase to the landing phase of the aircraft from a first position sensor; receiving, by the processor, a second stroke of the second shock strut from the takeoff phase to the landing phase of the aircraft from a second position sensor; receiving, by the processor, a third stroke of the third shock strut from the takeoff phase to the landing phase from a third position sensor; and determining, by the processor, the takeoff phase by receiving a fully extended (or near fully extended) stroke measurement from at least one of the first position sensor, the second position sensor, and the third position sensor. The method may further comprise determining, by the processor, the landing phase by receiving the near fully extended stroke measurement and a minimum stroke below a stroke threshold over a predetermined period of time from at least one of the first position sensor, the second position sensor, and the third position sensor; receiving for a first period time in the predetermined time period the minimum stroke; and receiving in a second period of time in the predetermined time period the near fully extended stroke measurement. Determining the center of mass of the aircraft may further comprises averaging, by the processor, a first force of the first shock strut, averaging a second force of the second shock strut, and averaging a third force of the third shock strut from the takeoff phase to the landing phase. The center of mass may be determined in a horizontal plane.

A center of mass estimation system is disclosed herein. The center of mass estimation system may comprise: an aircraft configured for vertical lift; a landing gear arrangement including: a right hand side (RHS) landing gear assembly having a first shock strut with a first pressure sensor; a left hand side (LHS) landing gear assembly having a second shock strut with a second pressure sensor, the LHS landing gear assembly and the RHS landing gear assembly separated by a wheel tread distance along a wheel tread axis; a center landing gear assembly having a third shock strut having a third pressure sensor, the center landing gear assembly separated from the wheel tread axis by a wheelbase distance along a wheelbase axis, the wheelbase axis being perpendicular to the wheel tread axis; a controller in electrical communication with the first pressure sensor, the second pressure sensor, and the third pressure sensor; and a device electrically coupled to the controller, the device configured to receive a center of mass estimation along a horizontal plane, the horizontal plane defined by the wheel tread axis and the wheelbase axis.

In various embodiments, the controller may be operable to receive a first pressure from the first pressure sensor, receive a second pressure from the second pressure sensor, and receive a third pressure from the third pressure sensor from a takeoff phase to a landing phase of the aircraft. The controller may be operable to average a first measurement of the first pressure from the takeoff phase to the landing phase, average a second measurement of the second pressure from the takeoff phase to the landing phase, and average a third measurement of the third pressure from the takeoff phase to the landing phase. The controller may be operable to determine a center of mass lateral distance from the wheelbase axis and a center of mass longitudinal distance from the wheel tread axis. The controller may be operable to determine the takeoff phase based on at least one of the first pressure, the second pressure, and the third pressure dropping below a takeoff pressure threshold. The controller may be operable to determine the landing phase based on at least one of the first pressure, the second pressure, and the third pressure rising and remaining substantially constant for a predetermined period of time. The center of mass estimation system may further comprise a first position sensor of the first shock strut, a second position sensor of the second shock strut, and a third position sensor of the third shock strut, wherein the first position sensor, the second position sensor, and the third position sensor are in electrical communication with the controller. The controller may be operable to determine the landing phase based on at least one of receiving a stroke measurement from at least one of the first position sensor, the second position sensor, and the third position sensor being near fully extended for a first period of time in a predetermined time period; and receiving the stroke measurement from at least one of the first position sensor, the second position sensor, and the third position sensor being a minimum stroke below a stroke threshold in a second period of time in the predetermined time period.

An article of manufacture is disclosed herein. The article of manufacture may include a non-transitory, tangible computer readable storage medium having instructions stored thereon that, in response to execution by an aircraft center of mass estimation system, cause the aircraft center of mass estimation system to perform operations comprising: measuring, by the aircraft center of mass estimation system, a first pressure of a first shock strut from a takeoff phase to a landing phase of an aircraft; measuring, by the aircraft center of mass estimation system, a second pressure from the takeoff phase to the landing phase of the aircraft; measuring, by the aircraft center of mass estimation system, a third pressure from the takeoff phase to the landing phase of the aircraft; generating, by the aircraft center of mass estimation system, a center of mass estimation of the aircraft based on a first average pressure of the first pressure, a second average pressure of the second pressure, a third average pressure of the third pressure, a wheel tread distance, and a wheelbase distance; and transmitting, by the aircraft center of mass estimation system, the center of mass estimation to a device in the aircraft.

In various embodiments, the operations further comprise determining, by the aircraft center of mass estimation system, the takeoff phase from the measuring of at least one of the first pressure, the second pressure, and the third pressure. The operations may further comprise determining, by the aircraft center of mass estimation system, the landing phase from the measuring of at least one of the first pressure, the second pressure, and the third pressure. The operations further may further comprise beginning measuring the first pressure, the second pressure, and the third pressure in response to determining the takeoff phase. The operations may further comprise ending measuring the first pressure, the second pressure, and the third pressure in response to determining the landing phase has ended.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized, and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Aircraft landing gear systems of an aircraft in accordance with the present disclosure may comprise a shock strut. Estimation of a center of mass of the aircraft may be determined through the shock strut by measuring certain variables through the shock strut, including gas pressure, and/or stroke of the shock strut at various points during operation of the aircraft, and calculating the center of mass from the variables.

Figure 1A:
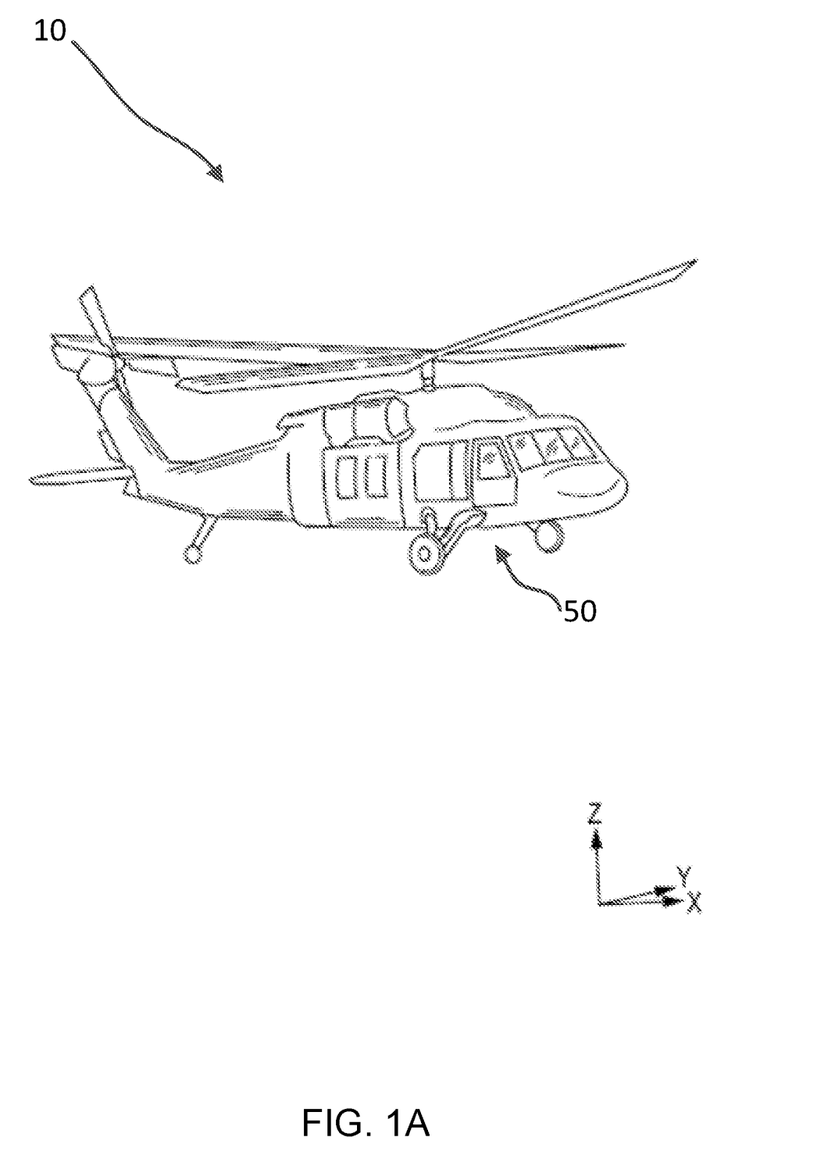
FIG. 1A illustrates, a perspective view of an aircraft with a landing gear assembly in accordance with various embodiments.

Accordingly, with reference to FIG. 1A, a perspective view of an aircraft 10, in accordance with various embodiments. The aircraft 10 may be configured for vertical takeoff (e.g., a helicopter, or the like). The aircraft 10 includes a landing gear arrangement 50. In various embodiments, the landing gear arrangement 50 may include at least three landing gear assemblies. In various embodiments, a mass estimation system including each landing gear assembly may be configured to calculate a force during a landing event. Each landing gear assembly in the landing gear arrangement 50 may include sensors configured to measure various variables and may use the variables to estimate a center of mass of the aircraft 10 along a horizontal plane.

Figure 1B:
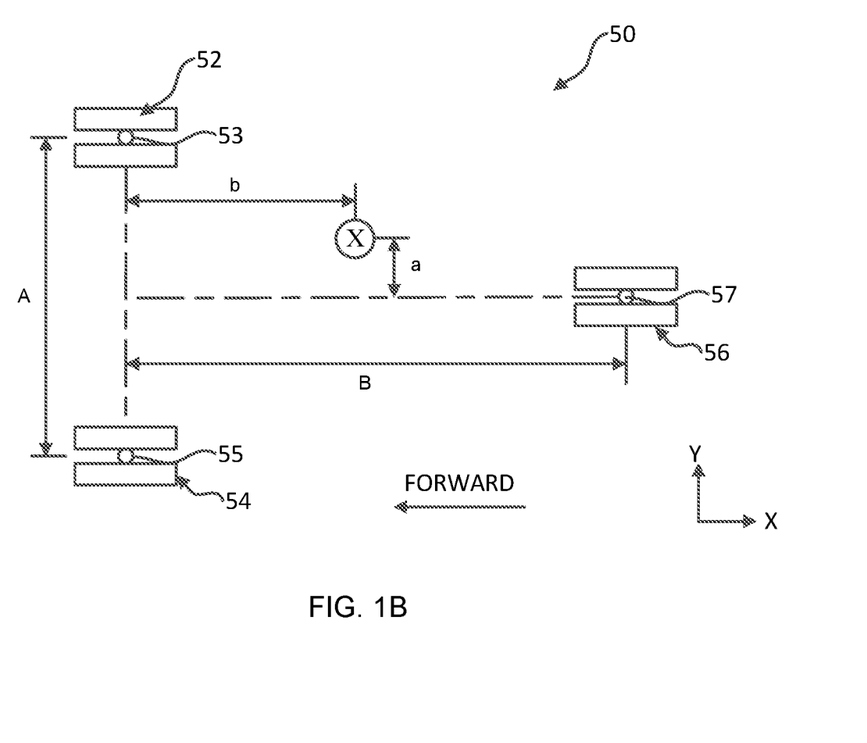
FIG. 1B illustrates, schematic view of a landing gear arrangement of the aircraft, in accordance with various embodiments.

Referring now to FIG. 1B, a schematic plan view of a landing gear arrangement 50, in accordance with various embodiments. The landing gear arrangement 50 may include a right hand side (RHS) landing gear assembly 52, a left hand side (LHS) landing gear assembly 54, and a center landing gear assembly 56. In various embodiments, the center landing gear assembly 56 may be disposed aft or forward of the RHS landing gear assembly 52 and the LHS landing gear assembly 54. Although illustrated as including two-wheel landing gear assemblies, any number of wheels is within the scope of this disclosure. For example, each landing gear assembly (e.g., landing gear assemblies 52, 54, 56) may include one wheel, two wheels, four wheels, eight wheels, or any other number of wheels and be within the scope of this disclosure.

In various embodiments, each landing gear assembly (e.g., landing gear assemblies 52, 54, 56) may include a center contact point of the wheel(s) of each landing gear assembly. In various embodiments, a wheel tread (A) may be a distance between the center contact point 55 of LHS landing gear assembly 54 and the center contact point 53 of RHS landing gear assembly 52. Similarly, a wheelbase (B) may be a distance between the center contact point 57 of the center landing gear assembly 56 and a line from the center contact point 53 of the RHS landing gear assembly and the center contact point 55 of the LHS landing gear assembly 54, the distance being measured in a perpendicular direction to the wheel tread (A) measurement. In various embodiments, the wheel tread (A) may be measured along a lateral axis (e.g., X-Axis) and the wheelbase (B) may be measured along a longitudinal axis (e.g., Y-Axis).

Figure 2:
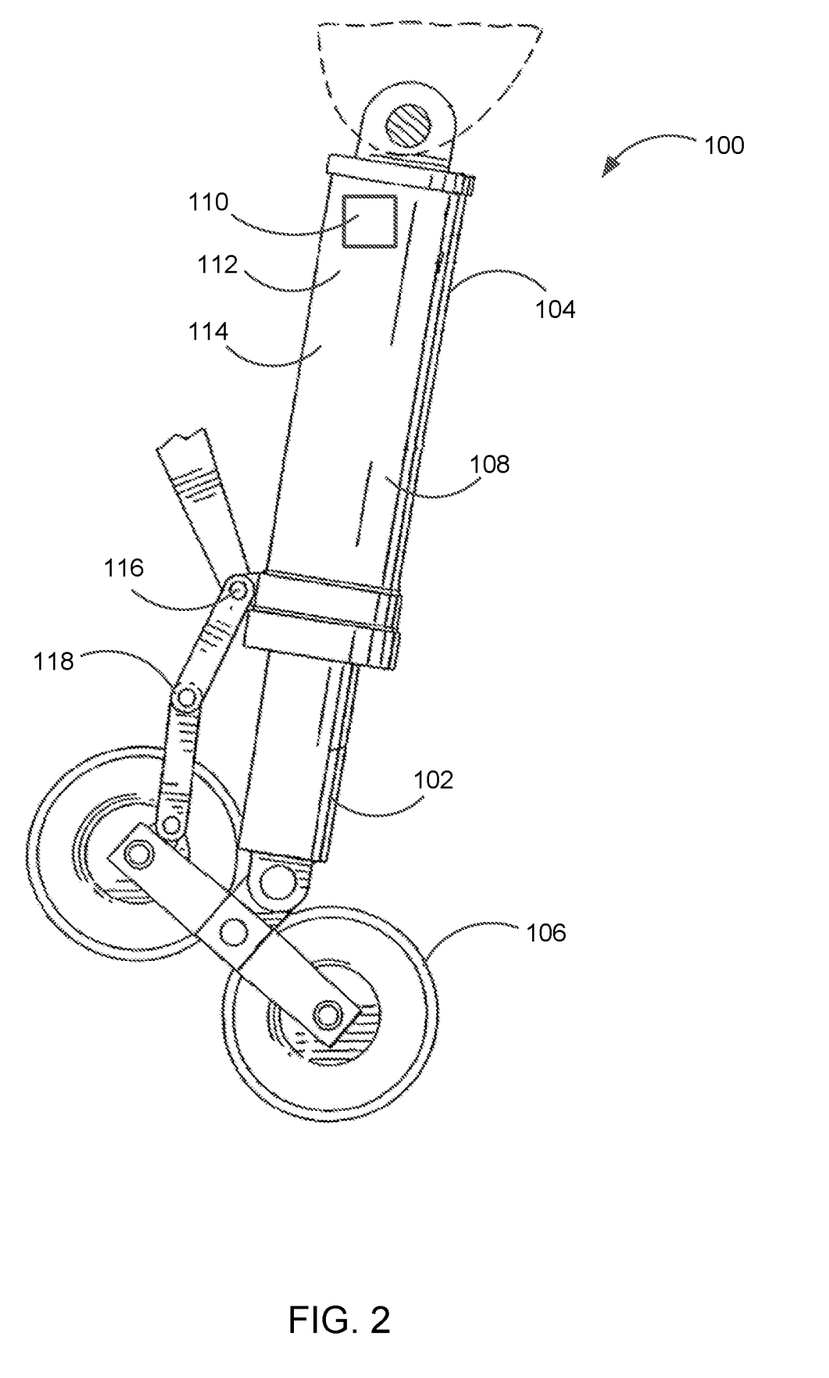
FIG. 2 illustrate a landing gear assembly with a shock strut in accordance with various embodiments.

With reference now to FIG. 2, a side view of the landing gear assembly 100 is illustrated, in accordance with various embodiments. In various embodiments each landing gear assembly from FIG. 1B (e.g., RHS landing gear assembly 52, LHS landing gear assembly, 54, and center landing gear assembly 56) may be in accordance with landing gear assembly 100. In various embodiments, landing gear assembly 100 comprises a shock strut 104. Shock strut 104 may be mechanically coupled to a wheel assembly 106. In various embodiments, shock strut 104 may be configured to absorb and dampen forces transmitted by wheel assembly 106 to an aircraft.

Shock strut 104 may comprise, for example, a piston 102 and a cylinder 108. Cylinder 108 may be configured to receive piston 102 in a manner that allows the two components to telescope together and absorb and dampen forces transmitted by wheel assembly 106.

In various embodiments, a liquid, such as hydraulic fluid or oil, is located within shock strut 104. Cylinder 108 and piston 102 may, for example, be configured to seal such that liquid contained within shock strut 104 is unable to leak as piston 102 moves relative to cylinder 108. Further, shock strut 104 may be configured to contain a gas. The air may be positioned above the gas (referred to as an "air-over-oil" arrangement) or vice versa. Similarly, cylinder 108 and piston 102 may be sealed such that gas is unable to leak as piston 102 moves relative to cylinder 108. As such, shock strut 104 may comprise a pressurized environment within cylinder 108. Although described as an "air-over-oil" arrangement," any shock strut configuration is within the scope of this disclosure. For example, the shock strut configuration may be a single stage separated air-oil, a dual stage separated air-oil, a dual stage mixed air-oil pressure activated, or a dual stage mixed air-oil stroke activated configuration and be within the scope of this disclosure.

Shock strut 104 may further comprise, for example, a gas pressure sensor 110. In various embodiments, gas pressure sensor 110 may be capable of measuring the pressure of the gas within shock strut 104 at a desired time. For example, gas pressure sensor 110 may measure the gas pressure within shock strut 104 before, during, or after take-off, or at any point during the duty cycle of shock strut 104.

In various embodiments, shock strut 104 may further comprise, for example, a gas temperature sensor 112. Gas temperature sensor 112 may be capable of measuring the temperature of the gas within shock strut 104 at any point during the duty cycle of shock strut 104.

Shock strut 104 may also comprise a position sensor 116. In various embodiments, position sensor 116 may be capable of measuring the position of piston 102 relative to cylinder 108, which is conventionally referred to as the stroke or stroke, of shock strut 104 at a desired time. Position sensor 116 may be configured to measure the position indirectly, for example, by measuring the orientation of one or more shock strut torque links 118 (or other components). For example, position sensor 116 may measure the stroke of shock strut 104 at any point during the duty cycle of shock strut 104.

Figure 3:
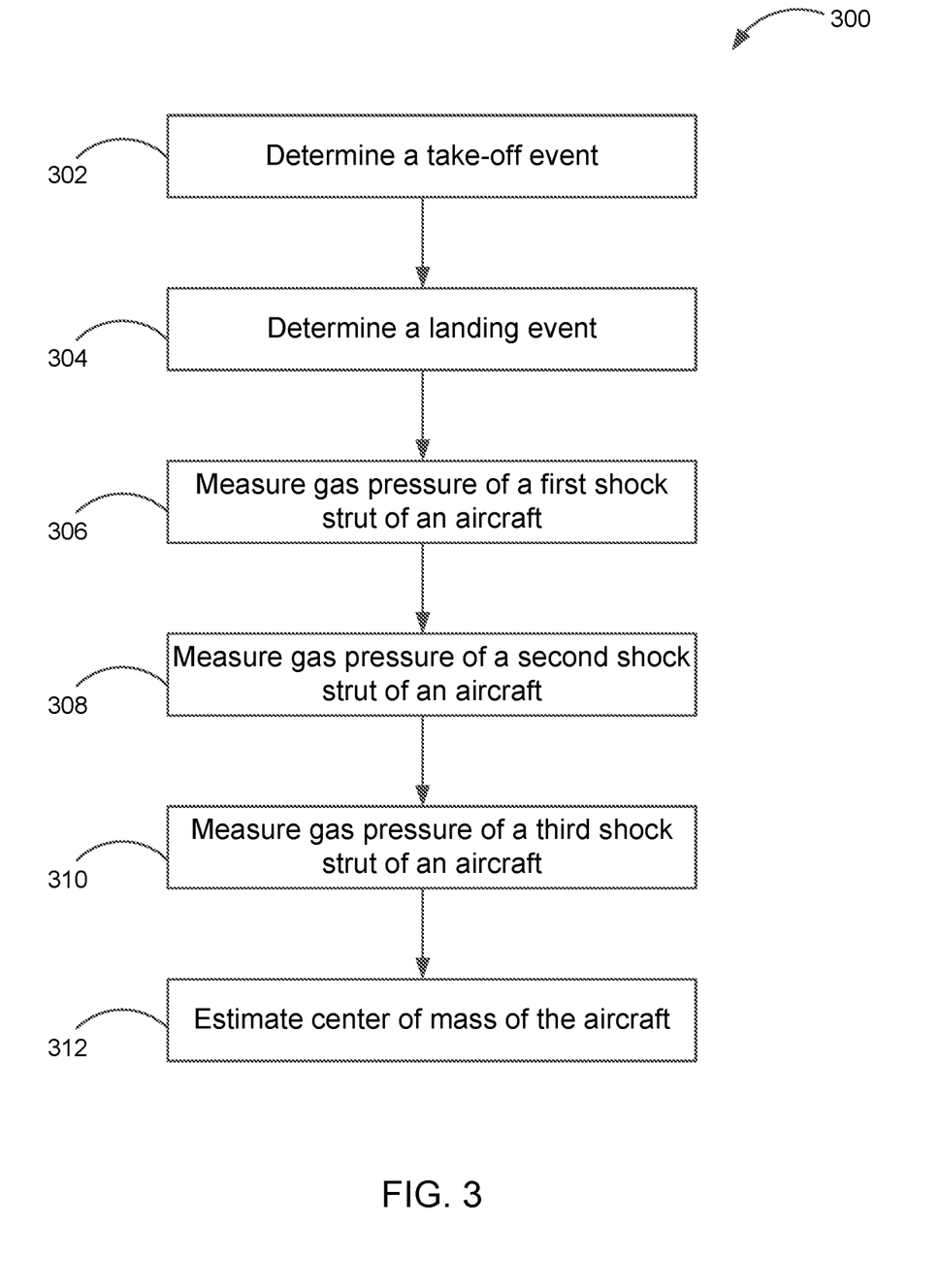
FIG. 3 illustrates a method for a center of mass estimation of an aircraft, in accordance with various embodiments.

With reference to FIG. 3, a method 300 for determining a center of mass of an aircraft is illustrated, in accordance with various embodiments. Method 300 may, for example, comprise utilizing data from a flight cycle (e.g., from just after takeoff and just after landing) to estimate a center of mass of an aircraft (e.g., aircraft 10 from FIG. 1A).

In various embodiments, method 300 may comprise determining a take-off event (step 302). The take-off event may be determined utilizing measurements from position sensor 116 or gas pressure sensor 110 from FIG. 2. For example, typically, a shock strut should extend to a fully extended position during take-off of an aircraft. As such, the position sensor 116 may determine the take-off event by measuring an extension of the shock strut and determining the shock strut is at or near fully extended. In various embodiments a take-off event may be determined solely from the gas pressure sensor 110. For example, the gas pressure sensor 110 may determine the take-off event by measuring a gas pressure below a threshold gas pressure. The threshold gas pressure may be slightly greater than a minimum pressure of the shock strut 104. In various embodiments, in response to determining the take-off event (e.g., step 302), at least one of pressure data and stroke data may begin being recorded for each landing gear assembly.

In various embodiments, at least one of the gas pressure and the stroke measurement for each shock strut may be measured from just after take-off (e.g., determined from step 302) to just after landing. For example, the method 300 further comprises determining a landing event (step 310). In various embodiments, only a single strut may be analyzed to determine take-off (step 302) and landing (step 304). The landing event may be determined utilizing measurements from position sensor 116 or gas pressure sensor 110 from FIG. 2. For example, shock strut may transition from a fully extended position to a stroke near zero during landing. As such, the position sensor 116 may determine the landing event by measuring an extension of the shock strut and determining the shock strut is at or near zero. For example, the position sensor 116 may determine a landing event has occurred when an array of position measurements (e.g., 15 seconds of measurements) shows a minimum stroke is less than 0.2 inches, a maximum stroke is greater than 10 inches, a stroke for the first five seconds of the array is less than 0.2 inches, and the maximum stroke in the first ten seconds of the array is greater than 9 inches. These parameters may be varied based on a given application. The first two criteria ensure that the set of data is associated to a landing, or a takeoff, or any other event that has caused shock strut 12 to travel between 0.2 inches to 10 inches. The third criterion ensures that the set of data is associated with a landing event, because in the first five (5) seconds the shock strut has been fully extended. The fourth criterion ensures that the chosen set of data also includes five (5) seconds of measurement after compression. If the data array meets all these criteria, it is categorized as a landing event.

In various embodiments a landing event may be determined solely from the gas pressure sensor 110. For example, the gas pressure sensor 110 may determine the landing event by measuring a gas pressure when an array of gas pressure measurements (e.g., 15 seconds of measurements) shows a plateau of gas pressure. For example, in accordance with various embodiments, the pressure measurements of the first five seconds of the array may be separated by 5%, 3%, or 1%. In various embodiments, in response to determining the landing event (e.g., step 302), pressure data may stop being recorded for each landing gear assembly and a center of mass may be calculated for the aircraft.

For example, the method 300 further comprises measuring gas pressure of a first shock strut of an aircraft (step 306), measuring gas pressure of a second shock strut of the aircraft (step 308), and measuring gas pressure of a third shock strut of the aircraft (step 310). The shock struts may be in accordance with the shock strut 104 from FIG. 2. The shock struts may be arranged in a landing gear configuration in accordance with landing gear arrangement 50 from FIG. 1B.

In various embodiments, a static measurement upon stabilization of the values just after landing may be determined from steps 306, 308, and 310. In this regard, after the pressure values from the gas pressure sensors have stabilized just after landing, the values may be transmitted to a center of mass estimator. The center of mass estimator may estimate a center of mass based on the stabilized values.

For example, in various embodiments, the method 300 further comprises estimating a center of mass of the aircraft (step 312). For example, if a pressure is measured and recorded of a shock strut from at least three landing gear assemblies from just after takeoff until just after landing and a cross-sectional area of the shock strut along with the gear rake angle are known, a force for each shock strut may be calculated and a center of gravity may be determined for a horizontal plane of the aircraft as a lateral distance (a) from wheelbase (B) and a longitudinal distance (b) from wheel tread (A) from FIG. 1B. For example, step 312 may comprise calculating the horizontal coordinates of the center of gravity of the aircraft based on the data collected during steps 306, 308, 310 and utilizing the following equations:

$$W_{A/C} = F_{CLG} + F_{RHS\ LG} + F_{LHS\ LG} =$$
$$\text{mean } (P_{CLG}(t-T:t) \times A_{CLG}) + \text{mean } (P_{RHS\ LG}(t-T:t) \times A_{RHS\ LG}) +$$
$$\text{mean } (P_{LHS\ LG}(t-T:t) \times A_{LHS\ LG})$$

$$b = \frac{F_{CLG}}{W_{A/C}} \times B = \frac{\text{mean } (P_{CLG}(t-T:t) \times A_{CLG})}{Weight_{A/C}} \times B$$

$$a = \frac{\left(F_{RHS\ LG} + \frac{F_{CLG} - W_{A/C}}{2}\right)}{W_{A/C}} \times A$$

In the above set of equations, $W_{A/C}$ is the weight of the aircraft, $F_{CLG}$ is the load applied to the aircraft by the center landing gear, and mean($P_{CLG}$(t−T:t)) is average center landing gear pressure over a period of T seconds, and $A_{CLG}$ is a piston cross-sectional area of center landing gear. Lateral distance (a) from wheelbase (B) and longitudinal distance (b) from wheel tread (A) are unknowns and solved for. It is of note the formulation showed above assumes a zero rake angle for all gears. For non-zero rake angles, the equations will be modified to determine the vertical component of the shock strut load.

Figure 4:
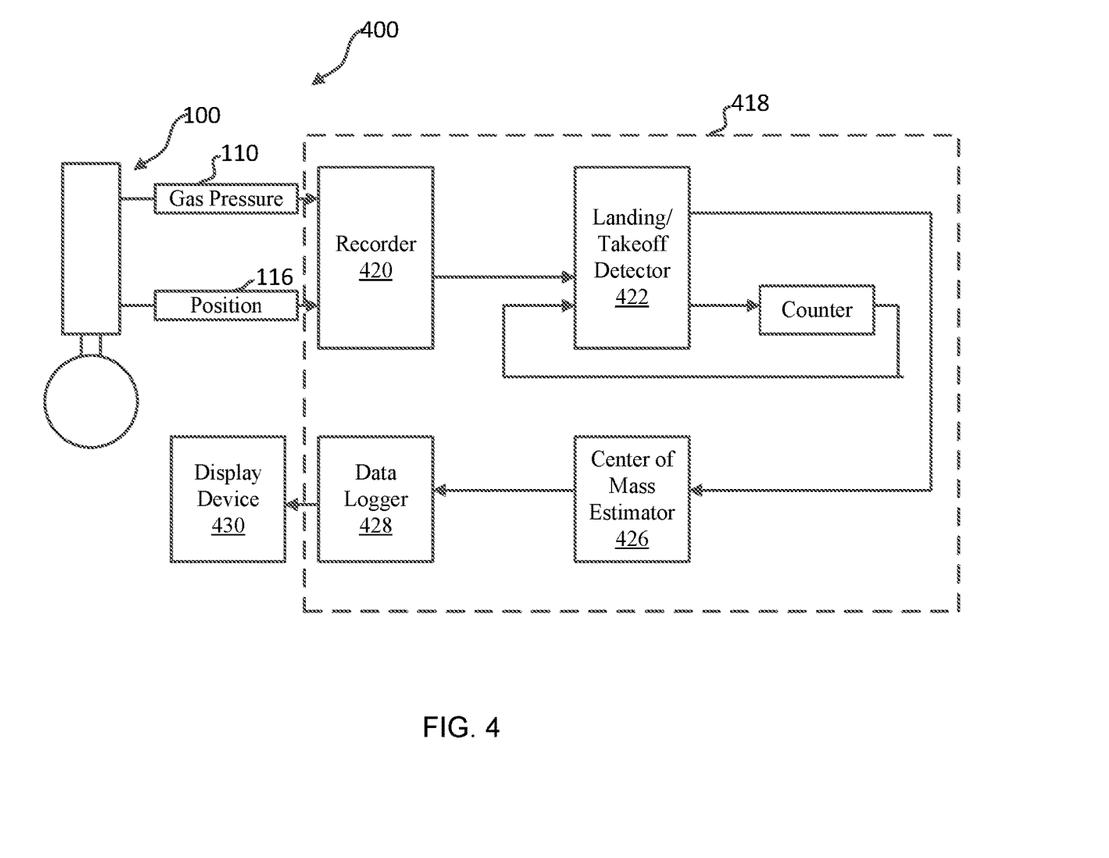
FIG. 4 illustrates a center of mass estimation system for an aircraft, in accordance with various embodiments.

FIG. 4 shows a block diagram of a center of mass estimation system 400. System 400 includes gas pressure sensor 110, and position sensor 116 mounted on shock strut 412, and digital processor 418. Pressure sensors 110, 114 and can be in the form of individual sensors or can be in the form of a combined pressure/temperature sensor. The servicing algorithm executed by processor 418 comprises the following sub-algorithms: recorder 420, landing/takeoff detector 422, counter 424, center of mass estimator 426, and data logger 428.

Recorder 420 acquires the gas pressure from pressure sensor 110 and the stroke parameter from position sensor 116. In various embodiments, recorder 420 records the two parameters in an array or circular buffer that keeps the readings for a set period of time, for instance 15 seconds. New set of recordings is added to top of the array and the oldest set of data is eliminated from the bottom of the array to keep the length of the array equivalent to 15 seconds of data. At any instant, recorder 420 exports the array which comprises the latest 15 seconds of data to landing/takeoff detector 422. At startup, when the length of the array is not equivalent to 15 seconds, recorder 420 sends a "false" detection state discrete signal to landing/takeoff detector 422, so that landing/takeoff detector 422 avoids using data from an incomplete array. Once 15 seconds of measurements is available in the array, the detection state discrete signal turns into "true" and allows landing/takeoff detector 422 to use the measurements.

Once landing/takeoff detector 422 receives the array of data, it checks the array against the following set of criteria:
(1) minimum stroke in the array is smaller than 0.2 inches (a selectable parameter),
(2) maximum stroke in the array is bigger than 10 inches (a selectable parameter),
(3) stroke for the first five (5) seconds of the array is less than 0.2 inches (a selectable parameter), and/or
(4) maximum stroke in the first ten (10) seconds of the array is bigger than 9 inches (a selectable parameter).

The first two criteria ensure that the set of data is associated to a landing, or a takeoff, or any other event that has caused shock strut 12 to travel between 0.2 inches to 10 inches. Upon detecting a landing, the landing/takeoff detector may active the center of mass estimator. In this regard, since the system 400 has identified a change in landing gear shock strut stroke, the system may estimate a center of mass upon landing. Upon detecting a landing (after detecting a takeoff previously), the landing/takeoff detector may feed a stroke measurement from the position sensor 116 and the parameters from the gas pressure sensor 110 to the center of mass estimator just after landing. The third criterion is used to determine that the set of data is associated with a landing event, because in the first five (5) seconds the shock strut has been fully extended. The fourth criterion ensures that the chosen set of data also includes five (5) seconds of measurement after compression. In this regard, data is fed to the center of mass estimator 426 just after landing (approximately 5 seconds or the like). If the data array meets the first two requirements, but not the second two requirements, the data is classified as a takeoff and the center of mass estimator will not be activated. In this regard, a landing data arrays is fed to the center of mass estimator just after a landing is detected. If all these criteria are met, it is categorized as a landing event and the landing event is the data array fed to the center of mass estimator 426. Counter 424 is also started to prevent landing/takeoff detector 422 from receiving any new array for five (5) minutes (a selectable parameter). This relaxes the need for a high speed processor as data acquisition and center of mass estimation will not be performed simultaneously.

Center of mass estimator 426 utilizes real-time measurement of gas pressure, and/or shock strut stroke from a landing event. Center of mass estimator 426 determines an average force applied to each shock strut during the period of interest. Center of mass estimator 426 estimates the center of mass by calculating a distance in a horizontal plane (e.g., X-Y plane from FIG. 1B) from a lateral distance (a) from the wheelbase (B) and a longitudinal distance (b) from the wheel tread (A).

Data logger 428 records the outputs of center of mass estimator 426 for output to a display device 430. In various embodiments, display device 430 may be disposed in a cockpit of an aircraft (e.g., aircraft 10 from FIG. 1A). Gas pressure, and shock strut stroke for every flight cycle (e.g., take-off through landing) is recorded by data logger 428. Data logger 428 can provide indications to the display device 430 where the center of mass of the aircraft is (based on the center of mass estimation from the center of mass estimator 426). In various embodiments, the data logger may just communicate values or communicate code to an alternate device for further use.

In various embodiments, the period of interest may occur prior to a full flight cycle. For example, a pilot may wish to know the center of mass of the aircraft prior to flying. In such an instance, the pilot may takeoff vertically, hover for a few seconds, and then land within the time period outlined above. In this regard, a pilot may know an estimation of the current center of mass of the aircraft prior to a full flight cycle.

The following nomenclature corresponds to various equations and parameters described in the present disclosure:

$A_{CLG}$: Piston cross-sectional area of center landing gear $A_{LHS\ LG}$: Piston cross-sectional area of left hand side landing gear $A_{RHS\ LG}$: Piston cross-sectional area of right hand side landing gear $F_{CLG}$: Average force exerted on center landing gear $F_{LHS\ LG}$: Average force exerted on left hand side landing gear $F_{RHS\ LG}$: Average force exerted on right hand side landing gear $W_{A/C}$: Weight of aircraft T: An array length, for example 100 seconds mean($P_{CLG}$(t−T:t)): Average center landing gear pressure over a period of T seconds mean($P_{LHS\ LG}$(t−T:t)): Average left hand side landing gear pressure over a period of T seconds mean($P_{RHS\ LG}$(t−T:t)): Average right hand side landing gear pressure over a period of T seconds Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for estimating a center of mass of an aircraft via a shock strut system comprising:
   receiving, by a processor, a first gas pressure data of a first shock strut from a takeoff phase to a landing phase of the aircraft from a first gas pressure sensor;
   receiving, by the processor, a second gas pressure data of a second shock strut from the takeoff phase to the landing phase of the aircraft from a second gas pressure sensor;
   receiving, by the processor, a third gas pressure data of a third shock strut from the takeoff phase to the landing phase of the aircraft from a third gas pressure sensor;
   determining, by the processor, the center of mass of the aircraft based on the first gas pressure data, the second gas pressure data, the third gas pressure data, a wheel tread distance, a wheelbase distance, and landing gear rake angles; and
   transmitting, by the processor, the center of mass of the aircraft to a device.

2. The method of claim 1, wherein the takeoff phase is determined by sensing at least one of a first gas pressure in the first gas pressure data, a second gas pressure in the second gas pressure data, a third gas pressure in the third gas pressure data, being less than a threshold pressure.

3. The method of claim 2, wherein the landing phase is determined by sensing at least one of the first gas pressure in the first gas pressure data, the_second gas pressure in the second gas pressure data, the third gas pressure in the third gas pressure data, rises and then remains substantially constant over a predetermined period of time.

4. The method of claim 1, further comprising:
   receiving, by the processor, a first stroke of the first shock strut from the takeoff phase to the landing phase of the aircraft from a first position sensor;
   receiving, by the processor, a second stroke of the second shock strut from the takeoff phase to the landing phase of the aircraft from a second position sensor;
   receiving, by the processor, a third stroke of the third shock strut from the takeoff phase to the landing phase from a third position sensor; and
   determining, by the processor, the takeoff phase by receiving a near fully extended stroke measurement from at least one of the first position sensor, the second position sensor, and the third position sensor.

5. The method of claim 4, further comprising determining, by the processor, the landing phase by at least one of:
   receiving the near fully extended stroke measurement and a minimum stroke below a stroke threshold over a predetermined period of time from at least one of the first position sensor, the second position sensor, and the third position sensor;
receiving for a first period time in the predetermined period of time the minimum stroke; and
receiving in a second period of time in the predetermined period of time the near fully extended stroke measurement.

6. The method of claim 1, further comprising calculating a first force data based on the first gas pressure data, calculating a second force data based on the second gas pressure data, and calculating a third force data based on the third gas pressure data, wherein determining the center of mass of the aircraft further comprises averaging by the processor, a portion of the first force data of the first shock strut, averaging a second portion of the second force data of the second shock strut, and averaging a third portion of the third force data of the third shock strut from the takeoff phase to the landing phase.

7. The method of claim 1, wherein the center of mass is determined in a horizontal plane.

8. A center of mass estimation system, comprising:
an aircraft;
a landing gear arrangement including:
a right hand side (RHS) landing gear assembly having a first shock strut with a first pressure sensor;
a left hand side (LHS) landing gear assembly having a second shock strut with a second pressure sensor, the LHS landing gear assembly and the RHS landing gear assembly separated by a wheel tread distance along a wheel tread axis;
a center landing gear assembly having a third shock strut having a third pressure sensor, the center landing gear assembly separated from the wheel tread axis by a wheelbase distance along a wheelbase axis, the wheelbase axis being perpendicular to the wheel tread axis; and
a controller in electrical communication with the first pressure sensor, the second pressure sensor, and the third pressure sensor; and
a device electrically coupled to the controller, the device configured to receive a center of mass estimation along a horizontal plane, the horizontal plane defined by the wheel tread axis and the wheelbase axis, wherein the controller is configured to:
receive a first pressure data from the first pressure sensor, receive a second pressure data from the second pressure sensor, and receive a third pressure data from the third pressure sensor from a takeoff phase to a landing phase of the aircraft,
determine, based on the first pressure data, the second pressure data, and the third pressure data, the center of mass estimation, and
transmit the center of mass estimation to the device.

9. The center of mass estimation system of claim 8, wherein the controller is configured to average a first portion of the first pressure data measured from the takeoff phase to the landing phase, average a second portion of the second pressure data measured from the takeoff phase to the landing phase, and average a third portion of the third pressure data from the takeoff phase to the landing phase.

10. The center of mass estimation system of claim 9, wherein the controller is configured to determine a center of mass lateral distance from the wheelbase axis and a center of mass longitudinal distance from the wheel tread axis.

11. The center of mass estimation system of claim 9, wherein the controller is configured to determine the takeoff phase based on at least one of a first pressure in the first pressure data, a second pressure in the second pressure data, and a third pressure in the third pressure data dropping below a takeoff pressure threshold.

12. The center of mass estimation system of claim 9, wherein the controller is configured to determine the landing phase based on at least one of a first pressure measurement over time in the first pressure data, a second pressure measurement over time in the second pressure data, and a third pressure measurement over time in the third pressure data rising and remaining substantially constant for a predetermined period of time.

13. The center of mass estimation system of claim 8, further comprising a first position sensor of the first shock strut, a second position sensor of the second shock strut, and a third position sensor of the third shock strut, wherein the first position sensor, the second position sensor, and the third position sensor are in electrical communication with the controller.

14. The center of mass estimation system of claim 13, wherein the controller is configured to determine the landing phase based on at least one of:
receiving a stroke measurement from at least one of the first position sensor, the second position sensor, and the third position sensor being near fully extended for a first period of time in a predetermined time period; and
receiving the stroke measurement from at least one of the first position sensor, the second position sensor, and the third position sensor being a minimum stroke below a stroke threshold in a second period of time in the predetermined time period.

15. An article of manufacture including a non-transitory, tangible computer readable storage medium having instructions stored thereon that, in response to execution by an aircraft center of mass estimation system, cause the aircraft center of mass estimation system to perform operations comprising:
receiving, by the aircraft center of mass estimation system, a first pressure data of a first shock strut from a takeoff phase to a landing phase of an aircraft;
receiving, by the aircraft center of mass estimation system, a second pressure data from the takeoff phase to the landing phase of the aircraft;
receiving, by the aircraft center of mass estimation system, a third pressure data from the takeoff phase to the landing phase of the aircraft;
generating, by the aircraft center of mass estimation system, a center of mass estimation of the aircraft based on a first average pressure over a first period of time from the first pressure data, a second average pressure over a second period of time from the second pressure data, a third average pressure over a third period of time from the third pressure data, a wheel tread distance, and a wheelbase distance; and
transmitting, by the aircraft center of mass estimation system, the center of mass estimation to a device in the aircraft.

16. The article of manufacture of claim 15, wherein the operations further comprise determining, by the aircraft center of mass estimation system, the takeoff phase based on at least one of the first pressure data, the second pressure data, and the third pressure data.

17. The article of manufacture of claim 16, wherein the operations further comprise determining, by the aircraft center of mass estimation system, the landing phase from at least one of the first pressure data, the second pressure data, and the third pressure data.

18. The article of manufacture of claim 17, wherein the operations further comprise beginning receiving the first pressure data, the second pressure data, and the third pressure data in response to determining the takeoff phase.

19. The article of manufacture of claim 18, wherein the operations further comprise ending receiving the first pressure data, the second pressure data, and the third pressure data in response to determining the landing phase has ended.

* * * * *